Aug. 13, 1963   J. B. ORR   3,100,592
DISPENSING CONTAINER
Filed June 18, 1959   2 Sheets-Sheet 1

INVENTOR.
John B. Orr
BY
HIS ATTORNEYS

Aug. 13, 1963  J. B. ORR  3,100,592
DISPENSING CONTAINER
Filed June 18, 1959  2 Sheets-Sheet 2

INVENTOR.
John B. Orr
BY Green, McCallister & Miller
HIS ATTORNEYS

United States Patent Office  3,100,592
Patented Aug. 13, 1963

3,100,592
DISPENSING CONTAINER
John B. Orr, R.F.D. 3, Great Barrington, Mass.
Filed June 18, 1959, Ser. No. 821,299
2 Claims. (Cl. 229—2.5)

This invention relates to a container of expanded plastic or resin material, such as polystyrene, that is suitable for storing and dispensing materials and particularly powdered materials, such as salt, sugar, and chlorine cleansers that must be kept moisture-free.

It is well known that materials or products, such as above-mentioned, tend to deteriorate and become quickly damaged when subjected to dampness or slight moisture. The problem involves the provision of a relatively inexpensive plastic or resin dispensing container that is moisture-proof and within which the materials to be dispensed may be introduced at the factory in a convenient manner and may be sealed within the container in such a manner that the container is disposable and not reusable after its contents have been fully used.

Heretofore, containers of this type have been made of light weight metal or of paperboard side walls reinforced by metal end walls, so as to provide a relatively inexpensive construction. The problem of moisture pick-up in such containers primarily arises in connection with the storage and distribution of them prior to their sale to the ultimate consumer. I have found that an important factor, aside from the prevention of moisture pick-up, is the provision of a container that will withstand relatively rough usage in handling or shipping without breakage or without spoiling its sealed relationship.

It has thus been an object of my invention to provide a new and improved type of dispensing container in which material to be dispensed is kept entirely free from moisture, particularly prior to sale to the user.

Another object has been to solve the problem of providing an inexpensive moisture-proof and breakage-resistant dispensing container that will make practical the use of an expanded plastic or resin material.

Another object has been to provide procedure for sealing a bottom lid to a dispensing container of expanded resin material.

A further object of my invention has been to devise a container of expanded resin or plastic material, such as polystyrene, which will be relatively inexpensive to make and light in weight, that will be substantially breakage-proof, that will retain its contents in a moisture-proof relationship, and that will lend itself to convenient filling and sealing at the factory.

A still further object of my invention has been to develop an improved container that may be punctured by the user for dispensing its contents and which, up to such time, will maintain its contents in a moisture-proof relationship therein.

These and other objects of my invention will appear to those skilled in the art from the described and illustrated embodiments.

Figure 1:
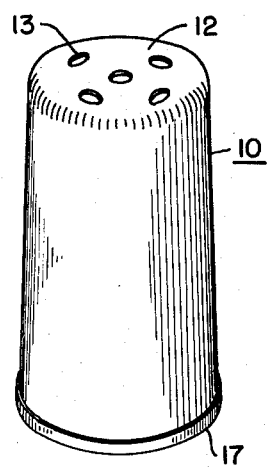
FIGURE 1 is a perspective view in elevation of a container constructed in accordance with my invention.
Figure 2:
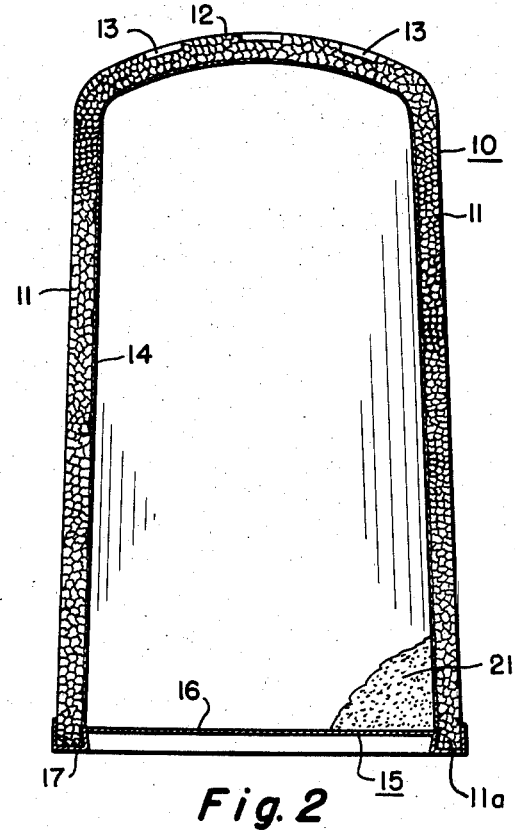
FIGURE 2 is an enlarged vertical section in elevation of the container of FIGURE 1, illustrating its bottom closure construction and its punch-out portions at its upper or feed top or end.
Figure 3:
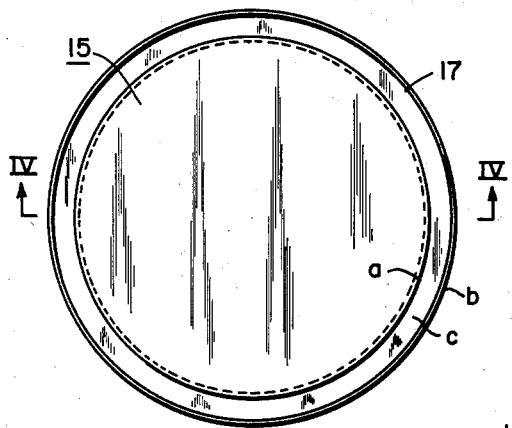
FIGURE 3 is a top plan view on the scale of FIGURE 2 of a bottom closure part or lid for the container of FIGURES 1 and 2.

In accordance with my invention, I form or mold a container body 10 of expanded resin or plastic bead material, such as polystyrene, by steaming-expanding the beads in a suitable mold, not shown. The container 10 is provided with a continuous side wall 11 and a continuously-integral, rounded or convex closing-off top or end wall 12 that define an open bottom end and an inner chamber to receive the material to be dispensed. The top wall 12 may have formed therein, as shown, a series of spaced-apart, indented, inwardly-offset, thin-wall portions or indentures 13 that are normally sealed-off by the body of the material, until the user desires to dispense the material in the container. At this time, he may use a sharp instrument, such as a nail or a pair of scissors, to punch through the thin wall portions 13, so that the contents may be sprinkled out, as desired.

The container 10 is shown of somewhat bell shape and has a relatively flexible and thin-wall construction. A wall thickness of about 3/16 of an inch has been found to be highly satisfactory, employing about two pounds density per cubic foot of expanded resin. An adherent, paraffin-like, wax coating 14 of from .002 to .010 of an inch in thickness may be applied along the inside surface of the container to positively prevent penetration of moisture vapor through its continuous wall, as by hot dipping it in a molten paraffin bath while protecting its outer surface with a paper or other temporary coating. Excess paraffin may be permitted to drip off before the container is cooled, as by a water or air spray, to set the paraffin.

A bottom end closure member or lid 15 is employed to close-off the open bottom end of the container after powdered material 21 has been poured into it, and while it is supported in an upside-down relationship. The lid 15 may be of somewhat flexible metal and has a substantially planar wall portion 16. It is shown provided with a continuous or circular trough or channel-shaped rim portion 17 which is adapted to be clamped against and about inner and outer opposed sides of or adjacent a lower lip edge of the side wall 11.

Although I have found that an expanded polystyrene container of about 5 to 8 pounds per cubic foot density is satisfactory for soap and creams which are usually packaged in open containers with screw lids, I have discovered that such a density tends to make the walls of the container somewhat brittle and thus, after being filled with cleansing powder and dropped on the floor, that the walls tend to crack, allowing the contents to spill. On the other hand, using a less dense material of less than about 3 pounds per cubic foot, I have discovered that the container is more resilient or flexible and will merely dent without breakage or loss of its contents, and can also be made fully moisture-resistant, as by applying an inner sealing coating 14.

Figure 6:
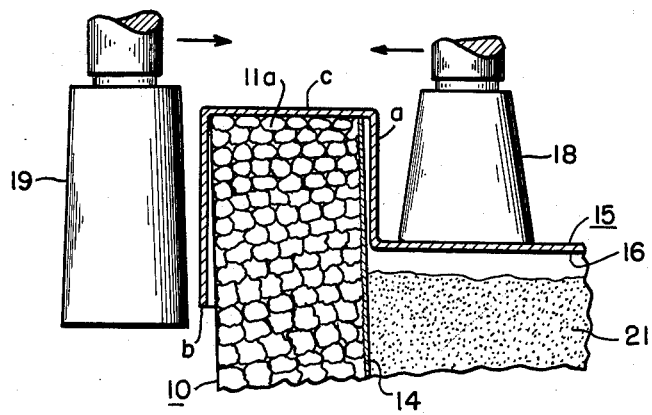
Figure 7:
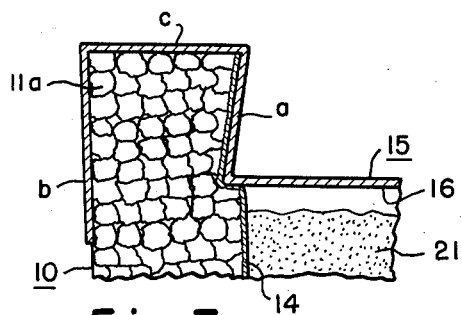
Figure 8:
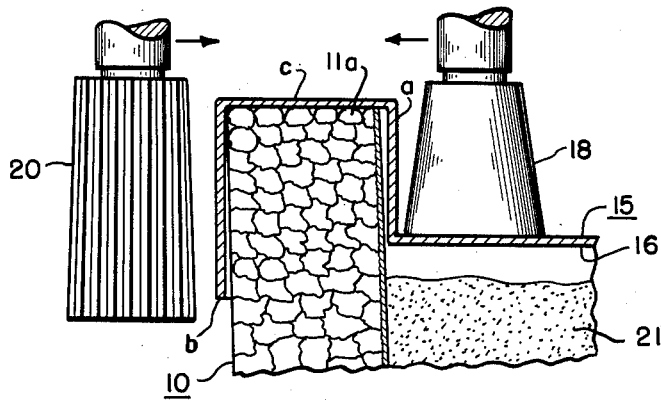

The lid or part 15 may be formed from any suitable material such as a thin metal blank of tin or aluminum, and then fitted to the container while it is in an upside-down position (see FIGURES 6 to 8). An inside vertical flange or circumferential edge wall portion $a$ of the trough 17, where it contacts the inside surface of the wall 11, may be expanded outwardly with a suitable tool, such as a roller 18, and an outside vertical flange or wall portion $b$ may be pressed inwardly by a tool, such as roller 19, to compress the resin wall between the inner and outer flanges or flange walls $a$ and $b$ to, with valley wall $c$, provide a vapor-tight seal and, at the same time, securely fasten the lid in position. It is possible to slightly compress the outer flange $b$ while at the same time outwardly-expanding the inner flange $a$, but such compression must be limited in extent because of the excess of metal formed on such inward compression that cannot be avoided with the small force permissible on the wall 11 of the expanded resin container. It will be noted that the inner flange $a$ is given a somewhat upwardly-outward slope to indent-latch with the resin wall 11 (see FIGURE 7).

Figure 5:
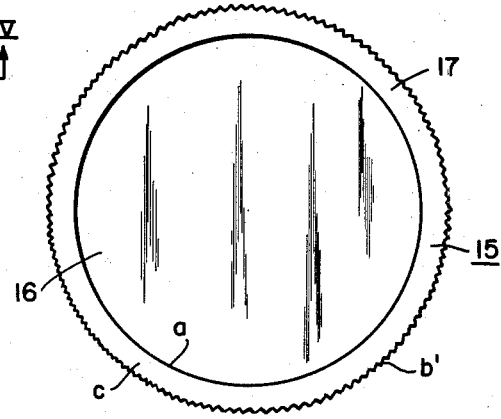
FIGURE 5 is a bottom plan view on the scale of and of the container of FIGURE 1, showing a lid part of FIGURES 3 and 4 in a crimped-on sealing and mounted relationship.
Figure 4:
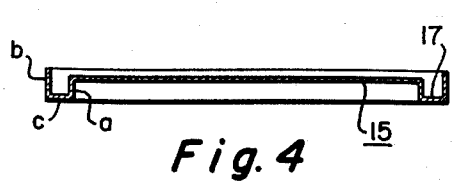
FIGURE 4 is a vertical section on the scale of and taken along the line IV—IV of FIGURE 3.

As an alternate, the flange wall $b$ of the lid 15 may be crimped inwardly, as shown in FIGURE 8, by a tool, such as a cone-shaped ribbed roller 20, and the inner flange wall $a$ expanded outwardly by tool 18. This provides a crimped outer flange portion $b'$ (see FIGURE 5). This helps to improve the attachment of the bottom and the moisture vapor barrier. As shown in FIGURES 1 and 7 of the drawings, the inside of the side wall of the container has a necked-in or grooved portion extending from the lip edge which defines the bottom opening to an adjacent inwardly-spaced position therefrom, such that the circumferential edge wall $a$ of the lid 15 has a secure, indented-latching relationship therewith to assure a vapor-tight sealing relation with respect to the container body.

It will be noted that the tools 19 and 20 are shown as having a slight slope and the tool 18 as having a greater slope, such that the inner flange $a$ (as formed) has a greater necking-in slope than the flange $b$ or $b'$ (as formed). For this purpose, the tools may be of somewhat conical or frustro-conical shape.

What I claim is:

1. In a dispensing container of expanded resin bead material that is suitable for storing and dispensing a powdered material, a unitary self-supporting lightweight resilient body of somewhat bell-shape that can be dropped on the floor with the powdered material therein without cracking, said body having continuous side and top walls defining a chamber for receiving therein the powdered material to be dispensed and having an open bottom end portion defined by a continuous lip edge about the side wall, said walls and said lip edge having a thickness of about 3/16 of an inch and having a density of less than about 3 pounds per cubic foot, said body being directly steam expansion-formed from expanded polystyrene beads in a mold; a flexible disc-shaped bottom closure member having a circumferential edge wall thereabout, the inside of said side wall having a circumferential groove portion extending inwardly along said side wall from said lip edge to a position adjacent thereto, said circumferential edge wall of said lid having a secure indented-latching engagement within and pressure fit with said groove portion that provides a vapor-tight pressure seal with the side wall to retain the powdered material within the chamber of said body, and said top wall of said body being of outwardly-rounded shape and constructed for dispensing the powdered material from the chamber thereof.

2. In a dispensing container as defined in claim 1 wherein the inner surfaces of the side and top walls of said body have an adherent paraffin-like coating thereon of about .002 to .010 of an inch in thickness for providing said body with moisture resistance.

References Cited in the file of this patent

UNITED STATES PATENTS

| 225,785 | Beattie | Mar. 23, 1880 |
| 1,387,356 | Cook | Aug. 9, 1921 |
| 1,797,418 | Hothersall | Mar. 24, 1931 |
| 2,006,689 | Scott | July 2, 1935 |
| 2,137,041 | Barnes | Nov. 15, 1938 |
| 2,162,162 | De Murguiondo | June 13, 1939 |
| 2,167,654 | Hothersall | Aug. 1, 1939 |
| 2,349,962 | Harris | May 30, 1944 |
| 2,578,864 | Tupper | Dec. 18, 1951 |
| 2,606,708 | Irvan | Aug. 12, 1952 |
| 2,753,088 | Prahl | July 3, 1956 |
| 2,764,319 | Weimer | Sept. 25, 1956 |
| 2,820,671 | McFarland | Jan. 21, 1958 |
| 2,879,818 | Root | Mar. 31, 1959 |
| 2,942,301 | Price et al. | June 28, 1960 |
| 2,981,984 | Orr | May 2, 1961 |

FOREIGN PATENTS

| 969,450 | France | May 24, 1950 |
| 483,473 | Italy | July 30, 1953 |
| 798,069 | Great Britain | July 16, 1958 |
| 93,741 | Norway | Apr. 6, 1959 |